United States Patent [19]
Bertrand et al.

[11] Patent Number: 5,812,706
[45] Date of Patent: Sep. 22, 1998

[54] SCANNER OF ANY TYPE OF DOCUMENT AND IMPLEMENTATIOIN PROCESS FOR SAID SCANNER

[75] Inventors: Dominique Bertrand, 6, Rue Lacaille 75017; Jean-Marie Gatto, 9 Boulevard Flandrin 45116, both of Paris, France

[73] Assignees: Jean-Marie Gatto, London, England; Dominique Bertrand, Morley, Australia

[21] Appl. No.: 979,393

[22] Filed: Nov. 26, 1997

Related U.S. Application Data

[63] Continuation of Ser. No. 560,204, Nov. 21, 1995, abandoned.

[30] Foreign Application Priority Data

Dec. 2, 1994 [FR] France .................................. 94 14535

[51] Int. Cl.$^6$ ..................................................... G06K 9/20
[52] U.S. Cl. ......................................................... 382/312
[58] Field of Search .............................. 250/578; 355/23, 355/202, 204; 357/30; 358/401, 442, 443, 444, 460, 447, 488, 496, 296; 382/162, 167, 312, 313, 315, 321, 323, 324

[56] References Cited

U.S. PATENT DOCUMENTS

| | | | |
|---|---|---|---|
| 4,866,291 | 9/1989 | Shimada et al. | 250/578 |
| 4,975,787 | 12/1990 | Ijuin et al. | |
| 4,977,096 | 12/1990 | Shimada et al. | 357/30 |
| 5,077,810 | 12/1991 | D'Luna | 382/323 |
| 5,111,285 | 5/1992 | Fujita et al. | 358/447 |
| 5,136,665 | 8/1992 | Inoue | 355/23 |
| 5,361,134 | 11/1994 | Hu et al. | 358/296 |
| 5,414,251 | 5/1995 | Durbin | 382/321 |
| 5,450,500 | 9/1995 | Brett | 382/162 |
| 5,477,335 | 12/1995 | Tai | 382/167 |
| 5,595,445 | 1/1997 | Bubry | 382/313 |

FOREIGN PATENT DOCUMENTS

| | | |
|---|---|---|
| 0297559 | 1/1989 | European Pat. Off. . |
| 0398268 | 11/1990 | European Pat. Off. . |
| 0484900 | 5/1992 | European Pat. Off. . |
| 0532796 | 3/1993 | European Pat. Off. . |
| 4-280568 | 10/1992 | Japan . |
| 6-113091 | 4/1994 | Japan . |

*Primary Examiner*—Jose L. Couso
*Attorney, Agent, or Firm*—Pearne, Gordon, McCoy & Granger LLP

[57] ABSTRACT

The invention relates to a scanner of any type of document having at least one processing device making it possible to integrally control the scanner with its associated sensors and in particular to perform in real time the individual or collective gamma correction, as well as any specific digital processing of the image during acquisition and constituted by a plurality of points known as pixels, whereby the digital processing can have several coefficients and is consequently nonlinear. The invention also relates to the implementation of said scanner.

37 Claims, 7 Drawing Sheets

SCANNER OF ANY TYPE OF DOCUMENT AND IMPLEMENTATIOIN PROCESS FOR SAID SCANNER

This is a continuation of application Ser. No. 08/560,204, filed Nov. 21, 1995, now abandoned.

TECHNICAL FIELD

The present invention relates to a scanning reading device or scanner with respect to any type of document and the process for producing or implementing said scanner.

PRIOR ART

The scanner according to the present invention is an apparatus for reading documents by a large scan of lines, themselves constituted by a large number of light sensitive points, said points being known as pixels, the document being moved in front of the scanner. Each pixel of a sensor detects the light received by a small elementary surface.

The result obtained is a digitized image, represented by a matrix of said pixels, whose size is equal to the number of lines multiplied by the number of pixels per line.

Each pixel is defined in black and white by a single digitized value and in colour by three values, each associated with one of the three chosen primary colours.

Prior to the present invention the implementation of a scanner came up against two major disadvantages or defects which cannot be reconciled. Either the reading speed of the document is high, but then the individual and/or global brightness linearity of the pixels is very low. The high performance with respect to the processing speed makes it possible to increase the number of documents processed during a given time interval, but the quality is unsatisfactory with respect to the reproduction of the acquired images, the system being moved beyond the normal operating limits. Or on wishing to obtain a correct or high brightness linearity of the pixels, it is necessary to reduce the reading speed of the scanner and the associated sensors and said scanner would then be much slower and would no longer permit the processing of a large number of documents in a high performance manner, so that it would be unsatisfactory for the user.

Therefore a scanner, prior to the present invention, had to be a compromise of one or other of the two above criteria. Thus, users had scanners not satisfying their needs, which are defined as being the possibility of using a scanner permitting a rapid processing of documents, associated with a high quality acquired image reproduction, whilst in addition said scanner must have a reasonable cost.

A conventional improvement to existing scanners before the present invention aimed at increasing the quality of these two properties, but led to a product having a prohibitive cost and which could consequently also not satisfy the needs of users.

The object of the present invention is to ensure the complete management or control of a scanner with its associated sensors, whilst obviating the aforementioned disadvantages. The processing device considerably improves the characteristics, to the extent that it permits a very high document reading speed, whilst offering the processing of the digitized image of the document in real time with an excellent light linearity. Thus, the unit obtained is easy, reliable and reproducible as regards manufacture, because it operates digitally, i.e. no manual intervention and automatic tests and it is consequently inexpensive.

Another object of the invention is to permit, by means of the said processing device, to interface said scanner with a central unit, as well as with other peripheral units such as a printer, liquid crystal (LCD) or the like, a tactile panel or keypad of the flash or similar memory, a magnetic card reader, an optical code reader, a chip card reader, etc.

DESCRIPTION OF THE INVENTION

Therefore the invention proposes a scanner produced from conventional photosensitive elements having at least one processing device making it possible to integrally control the scanner with its photosensitive, illuminating and driving sensors and in particular perform in real time any digital processing of the image being acquired and constituted by a plurality of pixels.

By means of a digital processing device for the control of such a scanner, the invention more particularly makes it possible to obtain results, which would normally be those of a much higher performance scanner, both as regards the speed, and the resolution, together with a much higher price.

The aim is to permits its use on mediocre quality sensors and raise them to a high quality, so as to permit an easy, high performance and inexpensive implementation of a scanner and consequently obtain a scanner which, when equipped with such a device, has a high real time, processing speed, whilst also having an excellent linearity. The speed performance characteristics can e.g. exceed by a ratio of 10 the normal performance characteristics of a standard sensor prior to the present invention.

The term "real time" means that the processing is concomitant with the reading of the pixels.

The long term reliability and precision of the scanner according to the invention are guaranteed through the use of digital processes.

To this end the thus obtained scanner is characterized in that it is equipped with a device having at least acquisition and processing means enabling it to perform in real time all operations necessary for the processing and then storage of the acquired images, formed from pixels coming from a sensor.

According to an embodiment of the invention, said scanner is characterized in that the device comprises pixel group and/or individual processing means permitting the linearization either of a pixel or a group of pixels, i.e. so as to be able to process one pixel as opposed to the neighbouring pixels. The thus processed pixels are stored in a buffer store, whose capacity can extend from a fraction of a line up to a large number of lines scanned in this way.

Advantageously, according to a first feature of the scanner equipped with a processing device according to the invention, said pixel image acquisition means is an analog-digital converter, which may or may not be of the flash type and its dynamics can extend from one to twenty four bits. In exemplified manner, the thus obtained scanner has an eight bit sub-ranging analog-digital converter.

The present device does not relate to the converter, but to the entire processing chain between the output of the converter and a central processing unit or the like and to which are passed said processed pixels. The thus obtained scanner makes it possible to calibrate each pixel.

In order to do this, the pixels of the sensor in question are subject, one by one, to a calculation of their response curve. The curves obtained represent the sensitivity as a function of the received light level. These curves are called "gamma" and are rarely linear. An example of a gamma curve is shown in FIG. 1A.

Once each pixel has been linearized, according to a method which will be described hereinafter, the values of each curve associated with each pixel, are stored in a table which, according to the invention, is constituted by a buffer store positioned jointly with the processing device.

Generally the brightness is different for each pixel. Therefore in order to obtain a good linearity scanner, it is appropriate to subject the individual pixel curves to an operation of rendering uniform the complete sensor, so that the pixels of the sensor have precisely the same sensitivity curve and/or the same gamma.

The calibration processes described hereinbefore and the operation of the scanner are made possible by the invention, particularly due to the association of at least one multiplier and/or at least one adder and/or at least one multiplexer.

For this purpose, said means calculate said curve coefficients and store the results in a buffer store. After processing, these results make it possible to determine the coefficients which would have to be implemented for obtaining the desired linearization, in a first phase for each pixel and then in a second phase for all the pixels of the sensor.

The means used are e.g. adaptive methods, particularly the least squares method. These methods make it possible to obtain coefficients of the gamma curves, which are not linear. The device according to the invention advantageously makes it possible to process nonlinear curves with several coefficients.

It should be noted that as a result of the means used, it is now possible to apply virtually any type of linear or nonlinear, mathematical equation to the response curve of one or all the pixels. The light response curve of a sensor pixel is given in FIG. 1B for a typical pixel, 10 being ideal and 11, 12 and 13 conventional examples.

All other mathematical processes can be applied by means of the device according to the invention, e.g. differentiator, integrator of all instructions and of all types.

Once the linearization operation has been carried out both individually and globally for the complete sensor, each calculated coefficient is stored in a buffer store.

It should be noted that the buffer store used in the present invention is not a first in, first out (FIFO) register, but instead a conventional random access memory (RAM), so that costs can be considerably reduced.

Advantageously, the gamma linearization coefficients of the pixels are mixed with sensor uniformizing coefficients. This lead to an unchanged number of coefficients per pixel, which reduces the size of the buffer store of the coefficients. The calculations necessary for the combination of these coefficients can be performed by the central processing unit and/or jointly by the said unit and the device according to the invention.

Once these linearization, uniformization and/or e.g. correction operations of the sensor have been carried out for all the pixels, it is also possible with the device according to the invention, to simultaneously process the image being acquired in all desired ways, e.g. sharpness, blur, noise filtering, etc.

In an example implemented according to the invention, it is possible to specifically process the images constituted by pixels and for this purpose inter alia the Taylor method is used. The property of the Taylor matrix is to increase small light variation differences of the pixels and consequently the details. There is a relation between each pixel of the same image and this can be mathematically modified by a matrix or other processing.

An image represented by a series of points of variable light intensity can e.g. be interpreted as a bidimensional matrix, as shown in FIG. 2. In the example, each element of said matrix has a value varying from 0 to 255.

By means of the device according to the invention, it is possible to plot the histogram of values of all the pixels, as shown in FIGS. 3A, 3B and 3C respectively for little contrast, much contrast and a noise image (there is then an equal distribution of pixels for each intensity).

By means of the device according to the invention it is possible to increase or decrease the contrast. Thus, for example, the curve shown in FIG. 4B corresponds to an increase in contrast of the curve shown in FIG. 4A, taking e.g. the maximum of the curve of FIG. 4A and expanding it on either side by one or more adequate coefficients, which are not necessarily linear and/or symmetrical.

In another example consideration is given to the convolution applied by means of the invention. Use is then made of neighbouring pixels for calculating the value of the new pixel. For this purpose use is made of a matrix containing the necessary values and known as the "kernel". This kernel is preferably odd, e.g. 3×3. In order to improve the sharpness, it is e.g. possible to use a Laplace kernel.

The function of Laplace kernels is to improve the sharpness of the image by detecting changes in variations between neighbouring pixels (called contours) of an image and then add them to the original image. For example a dimension 3×3 Laplace kernel is:

$$\begin{bmatrix} -1 & -1 & -1 \\ -1 & 8 & -1 \\ -1 & -1 & -1 \end{bmatrix}$$

It is pointed out that for the example the central value is 8 and the sum of the kernel is zero. Therefore any representation with little contour variation is only slightly affected.

However, this kernel will considerably improve the contours of objects located within an image. In the case of the Laplace kernel, this increase takes place in all directions.

In an implementation according to the invention the following mathematical algorithms are applied:

The matrix of pixels $$\begin{bmatrix} P_{11} & P_{12} & P_{13} \\ P_{21} & P_{22} & P_{23} \\ P_{31} & P_{32} & P_{33} \end{bmatrix}$$

and the Laplace kernel $$\begin{bmatrix} -K & -K & -K \\ -K & (K \times 8)+1 & -K \\ -K & -K & -K \end{bmatrix}$$

The formula applied is:

$$P_{22}=((K \times 8)+1)P_{22}-K(P_{11}+P_{21}+P_{31}+P_{12}+P_{32}+P_{13}+P_{23}+P_{33})$$

All other coefficients of the kernel can be applied, bringing about a variation of the desired effect on the processing of the image.

According to a feature of the invention, it is possible to transform a relation of a matrix with n dimensions into n relations of a unidimensional matrix.

It is therefore e.g. possible to use a unidimensional, e.g. horizontal kernel and then another e.g. vertical unidimensional kernel, followed by the successive application of two processing operations to the image.

On the basis of what has been stated hereinbefore, all specific processing types can be applied to the image, e.g. contrast increase or decrease; brightness increase or decrease; noise filtering; mean value; median; blur; movement blur; etc.

To facilitate comprehension, a description will now be given of the operation of the device permitting the performance of the mathematical operations defined hereinbefore.

Advantageously, as a result of another feature of the invention the system has several passes per pixel or pixel group and is designed for the real time processing of the pixels. The acquired pixel processing means then use the modelled mathematical relation, by successively injecting for the same pixel into the multiplier the different necessary coefficients by means of multiplexers. The device is able to perform all necessary operations on each pixel or pixel group during the acquisition of the pixels and consequently in real time.

According to another feature of the invention, the relation governing the interaction of the surrounding pixels on a central pixel involves the intervention of a bidimensional matrix, as stated hereinbefore. The number of calculations to be performed is then often very large as a function of the chosen number of pixels to be processed. Thus, this number is dependent on the number of adjacent pixels to be taken into account for the processing of the image of a single pixel.

According to the process of the invention, to obviate this disadvantage, said matrix is transformed into two relations of a unidimensional matrix making it possible to reduce the size of the buffer store. For this purpose, the present processing device e.g. processes the first dimension of the matrix of said relation, e.g. horizontally on the pixels of the same line.

The central processing unit is e.g. able to process the e.g. vertical, second dimension of the relation during the time period when it is inactive. Thus, the central processing unit only stores the images supplied to it by the acquisition and processing device according to the invention. The free time lapse of the central processing unit is long, because the storage of the images takes place rapidly. It will be described hereinafter that according to another feature of the invention the transfer to the central processing unit takes place directly memory to memory, via the bus, and consequently only takes up little time for the thus freed central processor.

Thus, advantageously, there has been a reduction to the number of operations (to a sum H+V and not a product H.V, i.e. the matrix is n:n+n instead of being $n^2$) to which the pixels are exposed, which permits a considerable time gain and which in the invention is used either for processing more pixels, or for using a less costly and slower technology.

In exemplified manner, an explanation is given here of the number of operations to be performed. On taking a processing or treatment applicable to a 3×3 matrix, the number of operations to be performed is nine, whereas as a result of the aforementioned device it is reduced to 3+3, i.e. 6. Therefore the gain in operations is 9−6=3.

On taking a processing applicable to a 7×7 matrix, the number of operations to be performed is 49, whereas by means of the aforementioned device it is reduced to 7+7, i.e. 14. Therefore the gain in operations is 49−14=35.

In the device according to the invention it is possible to perform one operation per clock cycle of the ASIC. It is clear that it is then possible in exemplified manner to increase the number of operations as the clock frequency is a higher multiple than the acquisition frequency of the pixels.

If it is e.g. wished to perform operations on seven pixels, it is sufficient to choose the ASIC technology permitting the implementation of the device according to the invention in such a way that said component can operate seven times faster than the pixel acquisition speed. This can be very easily achieved with the available technologies.

Thus, any reduction in a number of operations leads to a time gain and therefore a gain of the equivalent equipment, or said operation gain makes it possible to perform more processing operations and is therefore more competitive, whilst remaining within a relatively inexpensive cost range.

According to the invention the means for processing the image of the pixels comprise at least one multiplier and/or at least one adder and/or at least one multiplexer, as well as at least one buffer store containing the sets of coefficients described hereinbefore.

Advantageously, according to the invention, it is also possible after calculating the linearization and/or correction coefficients of each pixel, to mix them with the coefficients of the specific processing phase of the pixels. This leads to a reduction in the number of operations on the pixels.

The images acquired and processed by the device associated with its sensor are stored in the buffer store. When the buffer store contains a processed line or fraction, said line is supplied to the central processing unit with a view to storing the image constituted by several lines. As stated hereinbefore, the transfer time to the central processing unit is well below the line acquisition time, so that said unit can perform all types of operations in the remaining time on the stored image.

According to a variant, the processing device according to the invention can be integrated into a conventional scanner which, with respect thereto, leads to a considerable improvement, a gain in time and linearity on the reading of the images, as well as space, etc. for a reasonable cost.

According to a variant, the processing device according to the invention can be integrated or jointly with the sensor.

According to another feature, the complete device according to the invention is implemented with the aid of at least one application specific integrated circuit or ASIC. This ASIC is e.g. placed on a printed circuit board, which can be connected to a central processing unit, such as a personal computer or PC (registered trademark) or something compatible therewith, but also with any other type of computer, i.e. micro, mini, host, etc.

The thus obtained scanner processing card or board also permits the interfacing of said scanner with a central processing unit, but also with peripherals such as at least one LCD or not and/or at least one thermal, ink jet or other printer, and/or a flash memory, and/or a static or pseudostatic, nonvolatile memory, and/or at least one dynamic RAM, and/or at least one optical reader, and/or at least one magnetic reader, and/or at least one tactile surface, and/or at least one chip reader, and/or at least one GPIO (general purpose input/output), etc.

In the same way said scanner processing board also makes it possible to control said peripherals.

According to another embodiment the processing part of the sensor is positioned jointly with the sensor either in the same case as the sensor, or on a small printed circuit directly connected to the vicinity of the sensor.

The scanner according to the invention can be applied to any use requiring the reading of a paper, photographic, radiological or similar document, cheque, acquisition bulletin, etc., so as to then be able to store and analyze it by the bias of specific processing software e.g. entered in the memory of a central processing unit to which the scanner is connected. The results of the processing can then be supplied to a central information collecting site. For example, said scanner can permit the reading and analysis of banknotes and can check their authenticity. After rapid and reliable reading, it also permits the interpretation of any other acquisition bulletin type.

DETAILED DESCRIPTION OF EMBODIMENTS

Figure 1A:
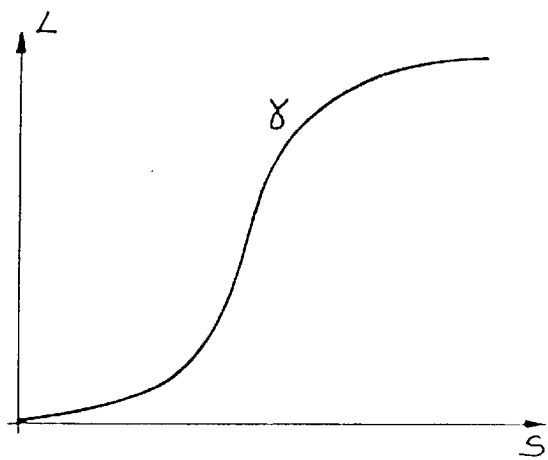
FIGS. 1A to 4B illustrate the curves obtained before and/or after mathematical processing according to the invention.
Figure 1B:
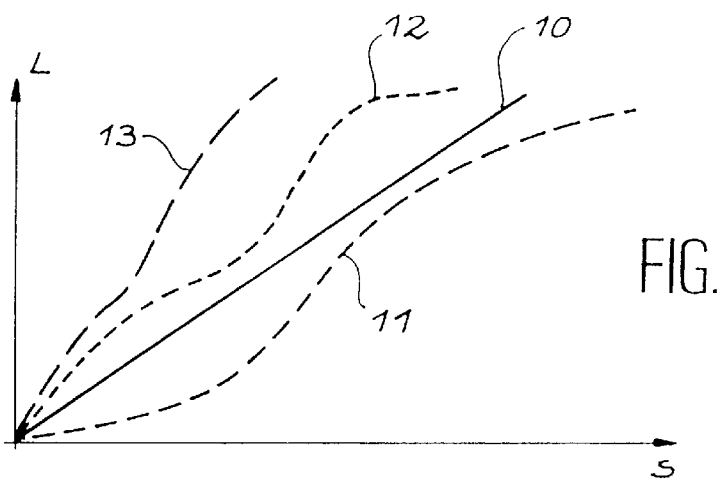
Figure 2:
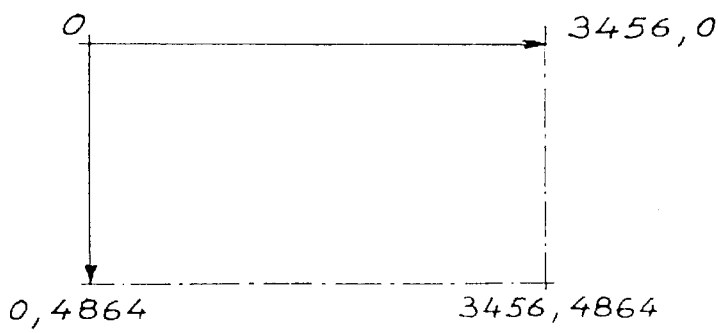
Figure 3A:
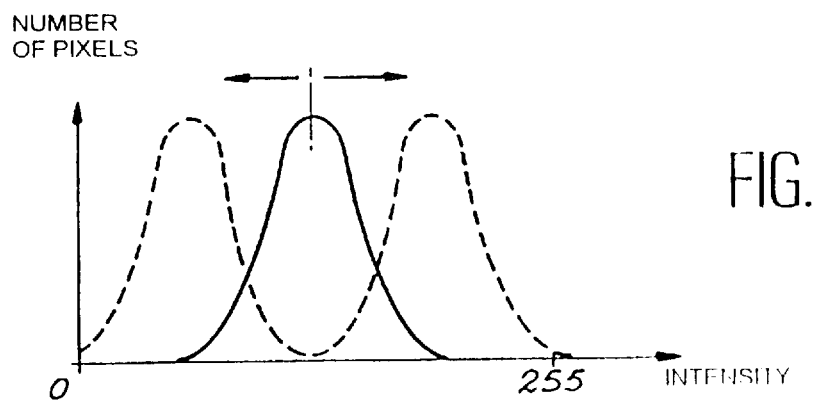
Figure 3B:
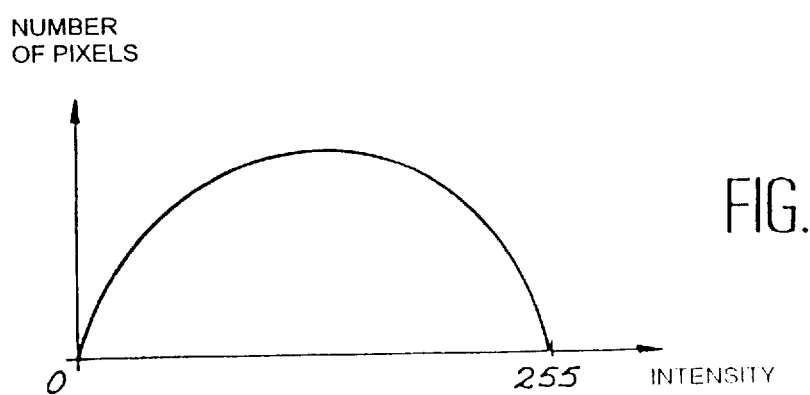
Figure 3C:
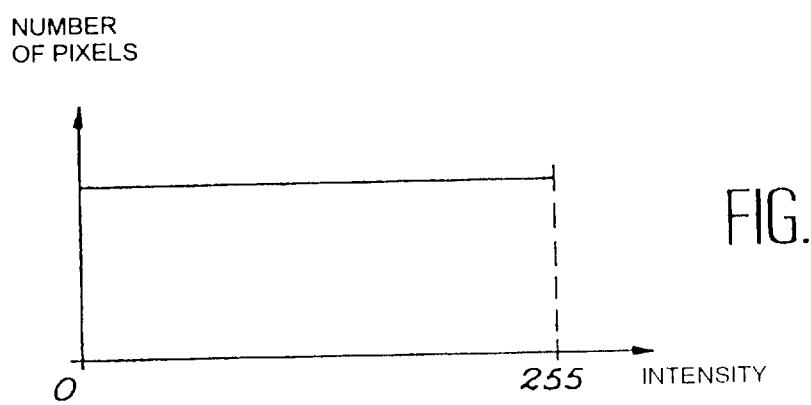
Figure 4A:
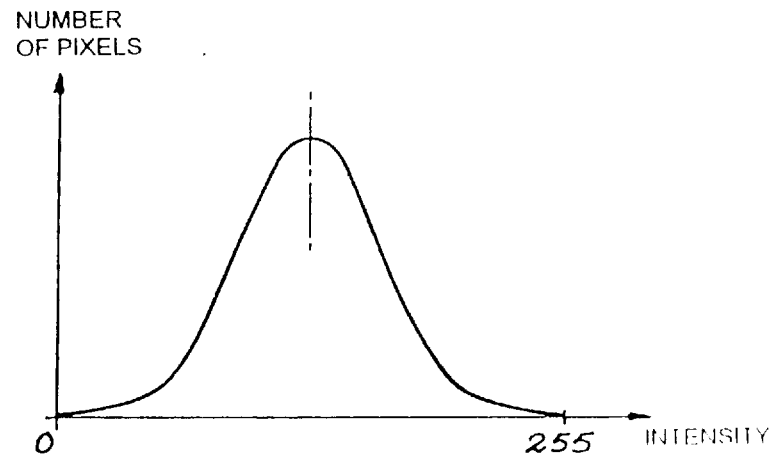
Figure 4B:
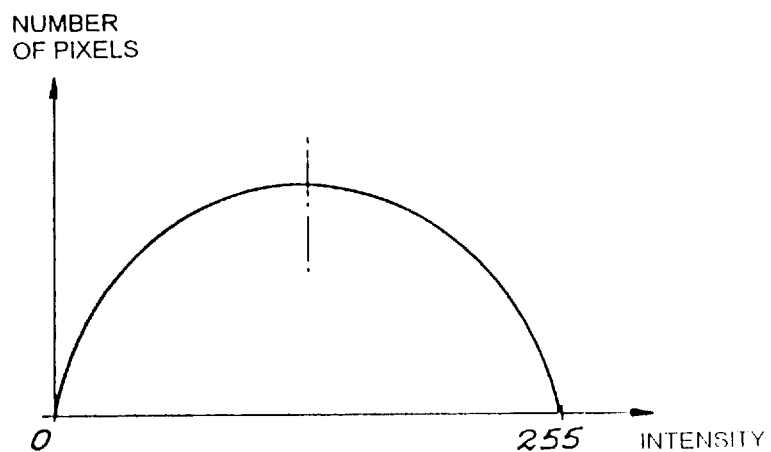
Figure 5:
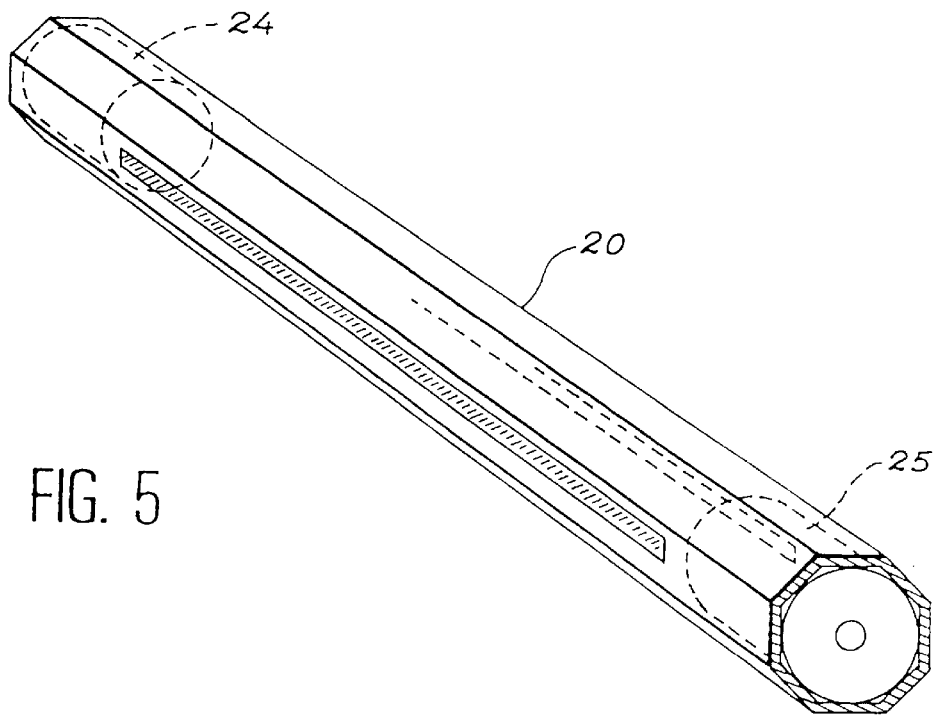
FIGS. 5 to 7 illustrate the mechanical structure of the scanner according to the invention.
Figure 6:
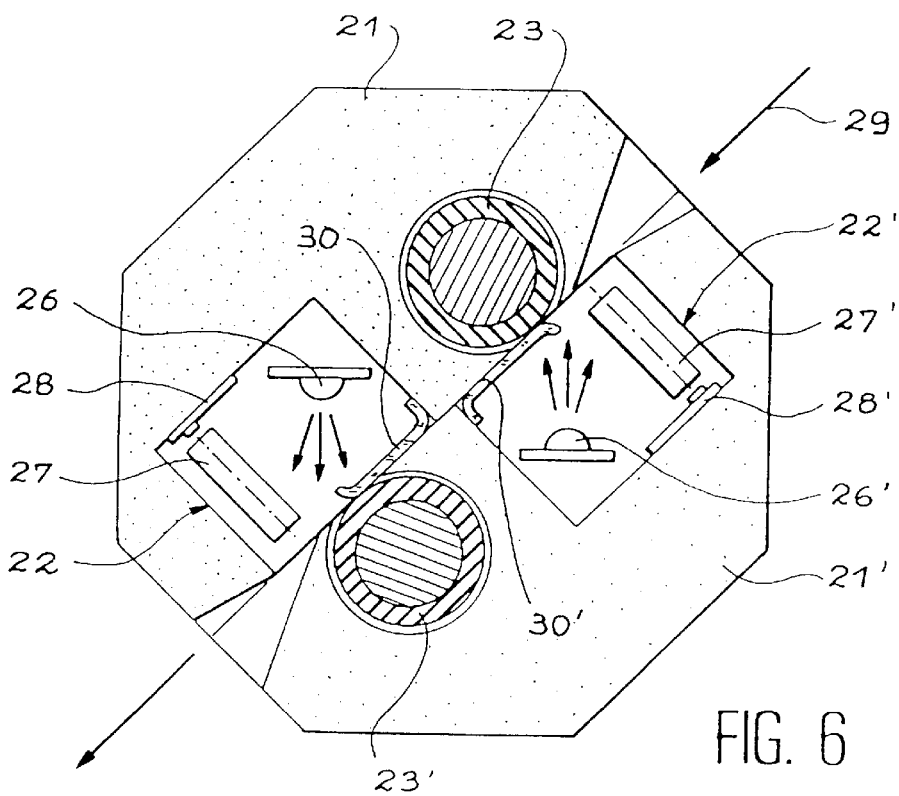

As shown in FIGS. 5 and 6, the case 20 of the scanner according to the invention is formed from two symmetrical parts 21, 21' connected in reverse manner with respect to one another so as to form a cylindrical or multifacet, elongated assembly. Each part 21, 21' contains a sensor 22, 22' and a drive roller 23, 23'. On or two drive motors 24, 25 are e.g. located in the extension of said scanner.

Each sensor comprises a series of emitting diodes 26, 26', which deliver light in the direction of the surface against which must pass the document 29 to be read, an optical focussing means 27, 27' and the actual sensor 28, 28'.

Advantageously, the optical focussing means is formed by a group of optical fibre sections of the same length, which are parallel and fixed together by resin, so as to permit the focussing of the image of one line.

The two case parts 21, 21' can advantageously be obtained with the aid of a die. They contain all the internal and external arrangements necessary for housing the mechanics and electronics required for the operation of the scanner.

Advantageously, a leaf or plate, e.g. a spring leaf or plate 30, 30', permits the displacement of the document to be read in the scanner and can be mobile about an axis or spindle 31.

This spring plate is in contact for cooperating with a drive roller on the upper face of the sensor, so as to permit by pressure the application of the document against the roller, so that it can be driven and uncreased, whilst also presenting said document at the correct locations with respect to the optical axis of the sensor.

In an embodiment said plate is formed by a transparent surface applied by pressure in contact in order to cooperate with the roller by means of a spindle, the pressure being provided either by a spring giving a torque to the spindle, or by a spring exerting a thrust against said surface.

In another embodiment the plate is formed by a transparent surface applied by means of an elastic system.

Figure 7:
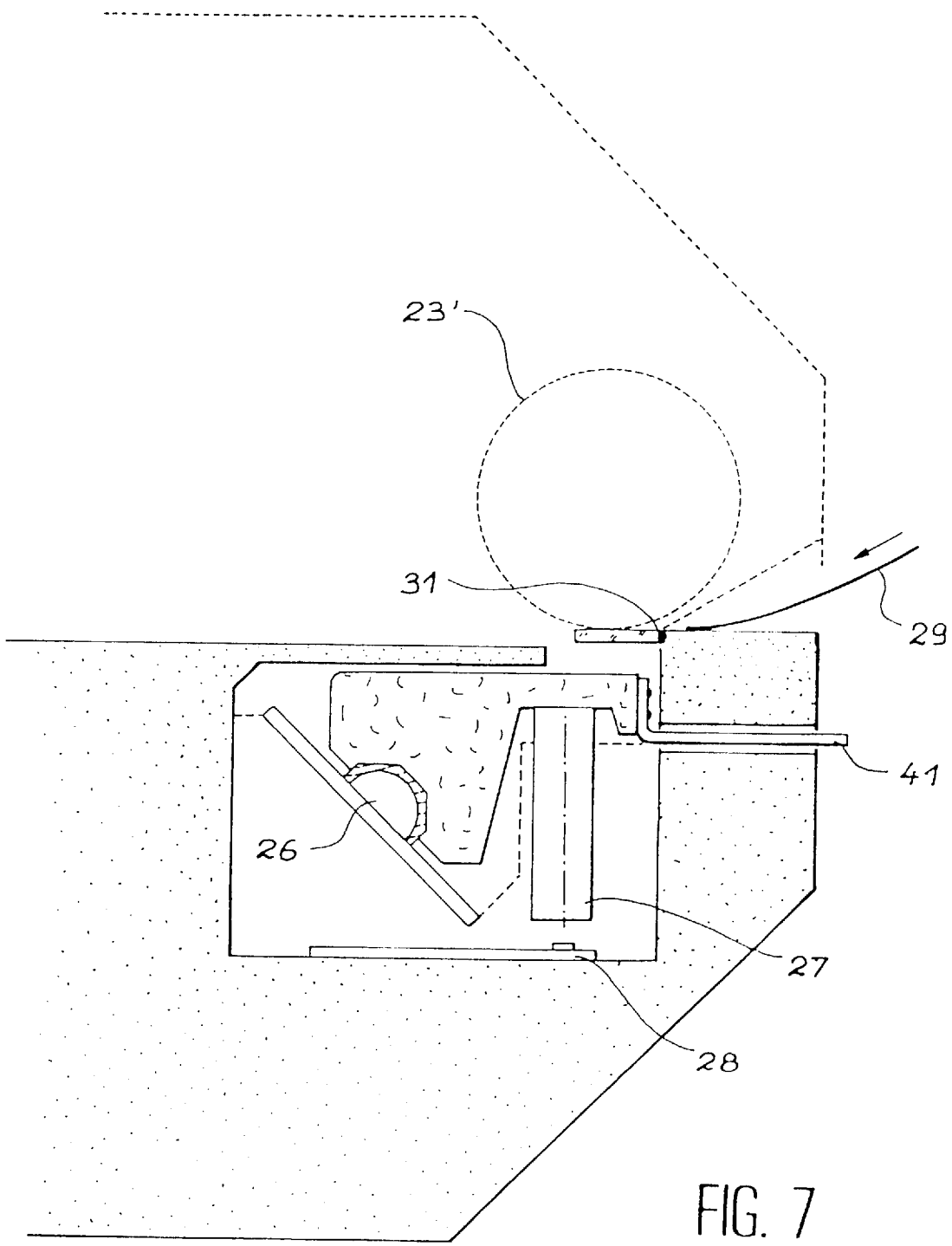

As shown in FIG. 7, at least one cleaning pad 40, to which is fixed a lamella 41, can slide along the scanner so as to permit a cleaning of the surfaces of the emitting diodes 26, 26' and optical focussing means 27, 27' without requiring a dismantling of the scanner case.

The sensors used in the embodiment are preferably contact image sensors (CIS) or non contact image sensors (NCIS), e.g. having 3456 pixels, which permits a resolution of 400 pixels per inch, but any other type can be used, e.g. up to 1600 pixels per inch. The acquisition of the pixels takes place by an analog-digital converter directly connected to the output of the sensor. An ancillary circuit 72 enables it to regulate its top and bottom conversion thresholds.

Figure 8:
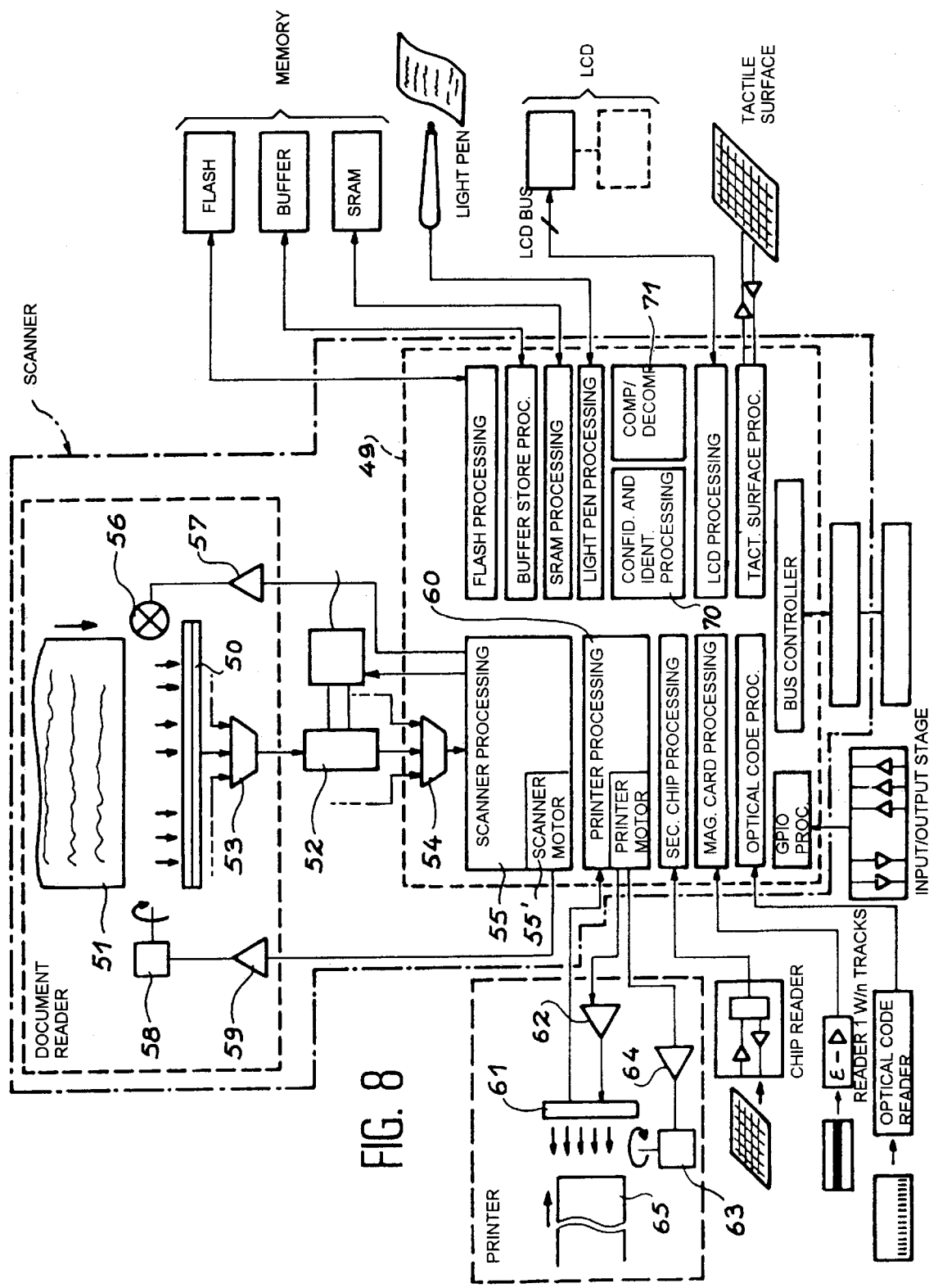
FIGS. 8 and 9 show several block diagrams illustrating the processing device for pixels and the peripherals of the scanner according to the invention.
Figure 9:
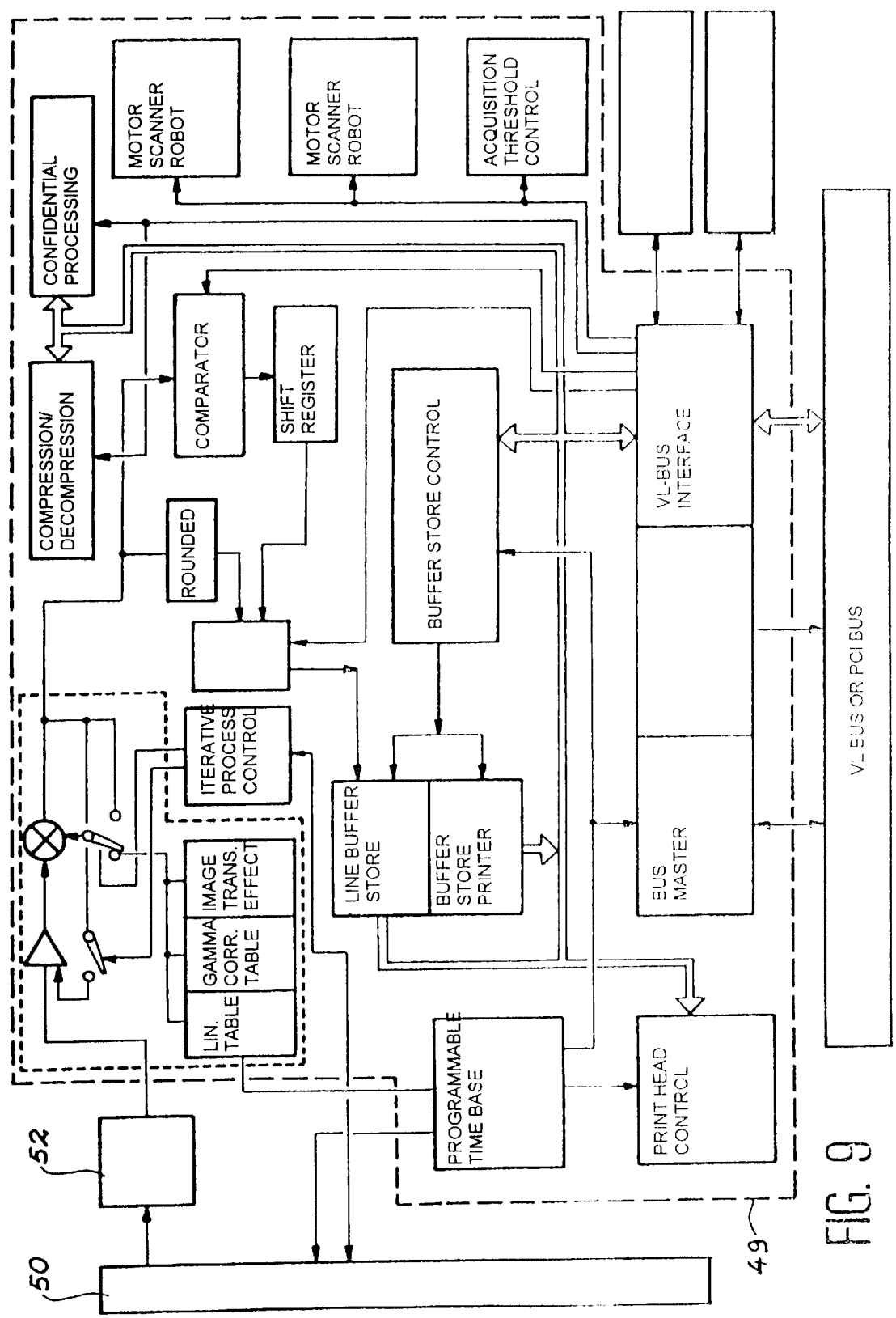

As shown in FIGS. 8 and 9, the electric circuit of the scanner according to the invention comprises at least one sensor 50 in front of which passes the document 51 to be read. This sensor is followed by an analog-digital converter 52, at least one multiplexer being positioned in front of the converter (analog multiplexer 53) and/or after said converter (digital multiplexer 54). If the multiplexer is digital (54), it can be included in the ASIC 49. The function of the multiplexer is to permit the use of more than one sensor.

A processing module of the scanner 55 forming part of the ASIC is connected to a light source 56 through an output stage 57 and to the motor 58 for advancing the document to be read through an output stage 59.

A processing module of the printer 60 is connected to a print head 61 through an output stage 62 and to a motor 63 through an output stage 64 so as to print the document 65.

As shown in FIG. 8, other modules of the ACIC are connected to a corresponding input-output element.

The operation of the scanner will now be described to provide a better understanding of the invention.

The first pixel of a pixel bar is converted and then transmitted to the multiplier, where operations are performed using a coefficient memory associated with a buffer store in which storage thereof takes place.

The following pixel is converted and then operations are also applied thereto and as a result of the device according to the invention and in particular the multiplexer can be a function of either the previously read pixel, or a correction table like that defined hereinbefore, or both of these. The stored value of said second pixel can consequently be a very complex value dependent on various factors. The same types of operation as hereinbefore can be applied to the following pixel and so on.

Thus, the stored value of a pixel can be a function of pixels in its vicinity associated with the aforementioned correction coefficients. It is also possible to carry out an operation several times for each pixel, the speed of the multiplier associated with the adder and the multiplexers being several times greater than that of the reading of the pixels, so that nonlinear operations are possible.

The storage in the buffer store takes place in concomitant manner with the operations necessary for the processing of a pixel.

It should be noted that in the case of specific processing operations for a group or matrix of pixels, the first pixel to be processed must wait for the storage of the number of pixels necessary for its processing, e.g. by the kernel matrix. As soon as this number is reached, each new pixel acquired is exposed to its real time processing phase.

Thus, e.g. if account is taken of six pixels for processing one pixel, the first six pixels are stored after e.g. linearizing them and then when the seventh arrives it is possible to perform the operations on the first pixel received from the line and so on for the remainder of the line pixels. The pixels which have undergone the various operations are then stored in the buffer store before being supplied to the central processing unit when the line fraction or line is complete.

In a pixel processing sequence the pixel is supplied to an adder and then to a multiplier, to which are connected a switch and an inverter, controlled by a control member.

It undergoes the different linearization and correction operations necessary for the bidimensional digital processing by means of the control of the multiplexers, which make it possible to apply the correct informations at the correct times and in particular the tables of linearization, correction and image processing coefficients used for these operations and which are contained in the buffer store, whose access is controlled by said control member.

Another multiplexer makes it possible to store the intermediate and/or final results of these operations on each pixel in the buffer store.

In addition, in order to obtain a more extensive grey range in the reproduction of the stored image, the processing device has a means making it possible to subtract or add an information, e.g. noise, so as to obtain a more extensive colour range, e.g. by so-called real time dithering. The number of colour levels can consequently pass from 256 to 1024 as a result of this processing operation.

In addition, the device according to the invention can interpolate pixels and thus virtually increase the resolution of the scanner, e.g. from 400 to 600 dpi in real time.

The time base makes it possible to supply control signals to the sensor, as well as to all the members described hereinbefore, so that all operations performed by the processing device can be synchronized.

Another device, incorporated into the system according to the invention, is constituted by a window logic comparator permitting the comparison of each pixel with a predetermined value in a table according to an upper and lower digital threshold, so as to subsequently permit the performance of operations as a function of the result obtained. This comparator intervenes in the exemplified device at the end of the processing operations, but can also intervene during the operations to which the pixel is exposed. It can e.g. permit the processing of the pixels received, once they have been linearized, in order to convert them into two and not 256 levels according to the example quoted, said two levels being determined as a function of thresholds applied to the comparator.

Another device according to the invention permits the real time compression of scanned lines, so this permits a time gain during transfer, as well as the memory space necessary for storing the images.

Another device 70 according to the invention makes it possible to confidentially process informations and can also be used for encrypting and/or decrypting informations. The control of such a scanner associated with this integrated confidentiality function according to the invention permits the writing and/or reading of encrypted signatures on analyzed documents.

A shift register permits the sequencing of each pixel in the successive operations described.

The device is provided with an internal bus, which in the described example has a width of 32 bits and functions at a frequency of 70 megahertz.

The invention also provides for connection to any type of bus.

According to a prototype, the processing device of the scanner has a VL-bus interface with a bus controller and a DMA controller, so as to be able to control data transfers from the scanner to the memory with a high flow rate.

According to another prototype the processing device of the scanner has a bus-PCI interface with a bus controller and a DMA controller, so as to be able to control data transfers from the scanner to the memory with a high rate.

However, the invention provides for connection to any bus type.

The ASIC according to the invention permits the plug and play (PnP) configuration of the host unit, i.e. an automatic configuration.

We claim:

1. Document scanner comprising at least one sensor (50) for reading an image, the image being formed by a plurality of pixels; photosensitive sensors; an illuminating device; a drive system; associated peripheral devices; and at least one digital processing device for performing digital processing of a scanned image in real time during reading, controlling the drive system, and controlling the peripheral devices, characterized in that the digital processing device includes at least on ASIC (49) for performing in real time digital processing of an image acquired, by:

subjecting the pixels of a sensor, one by one, to a calculation of their response-curves, the curves obtained being non-linear, multi-coefficients and representing sensitivity as a function of received light level, linearizing each pixel and storing the values of each curve associated with each pixel in tables, subjecting the individual pixel curves to an operation of rendering uniform the complete sensor, so that the pixels of the sensor have precisely the same sensitivity curve, calculating the curve coefficients and storing the results in a random access buffer store, determining linearization coefficients necessary for obtaining the desired linearization, in a first phase for each pixel and then in a second phase for all the pixels of the sensor, once the linearization operation has been carried out both individually and globally for the complete sensor, storing each calculated linearization coefficient in the random access buffer store, and mixing the linearization coefficients and the image computing coefficients of the pixels with sensor uniformizing coefficients.

2. Scanner according to claim 1, characterized in that the processing device of the pixels of the acquired images consists of at least one multiplier cooperating with at least one adder and with multiplexers, as well as with a buffer store.

3. Scanner according to claim 2, characterized in that the buffer store is a conventional RAM-type memory and not a FIFO register.

4. Scanner according to claim 1, characterized in that said processing device is able to individually or groupwise process pixels permitting the linearization of each pixel, and/or specifically process a group of pixels, i.e. process each pixel whilst taking account of the neighbouring pixels, the thus processed pixels being stored in a buffer store.

5. Scanner according to claim 4, characterized in that it comprises a digitizing device, which is a flash or sub-ranging or semi-flash-type analog-digital converter (52).

6. Scanner according to claim 1, characterized in that the processing device is integrated into a conventional scanner.

7. Scanner according to claim 1, characterized in that the processing assembly or part is integrated or arranged jointly with the sensor of the scanner.

8. Scanner according to claim 7, characterized in that the integrated part in the scanner (50) is that for the processing of the scanner with the associated controls (52, 53, 54, 55, 72).

9. Scanner according to claim 1, characterized in that said device can be connected to a central processing unit or any type of computer.

10. Scanner according to claim 1, characterized in that the device also permits the interfacing of said scanner with peripherals such as e.g. at least one LCD or non-LCD screen and/or at least one thermal, ink jet or other printer, and/or at least one flash memory, and/or at least one non-volatile, static or pseudostatic memory, and/or at least one dynamic RAM, and/or at least one optical reader, and/or at least one magnetic reader, and/or at least one tactile surface, and/or at least one chip reader and/or at least one GPIO, as well as to control the same.

11. Scanner according to claim 1, characterized in that it comprises a case constituted by symmetrical parts (21, 21') connected in reverse manner with respect to one another.

12. Scanner according to claim 11, characterized in that it forms an elongated, multifacet or cylindrical assembly.

13. Scanner according to claim 11, characterized in that each part of the case is obtained by passage in a die.

14. Scanner according to claim 11, characterized in that each part comprises all the internal and external arrangements necessary for housing the mechanics and electronics required for the operation of said scanner.

15. Scanner according to claim 1, characterized in that the sensor (50) is of the CIS, NCIS or CCD type.

16. Scanner according to claim 15, characterized in that a spring plate (30, 30') is provided for cooperating with a roller on the upper face of the sensor, said plate permitting both by pressure the application of the document to the roller, so that it can be driven and uncreased, and also presents said document at the correct locations with respect to the optical axis of the sensor.

17. Scanner according to claim 11, characterized in that it comprises at least one mobile, integrated, cleaning pad (40), displaceable along the reading window permitting the cleaning of the sensor, the light sources and/or the transparent surface without disassembly being necessary.

18. Scanner according to claim 1, characterized in that it can be used for any purpose requiring the reading and/or processing of a document, particularly, paper, photographic, radiological, acquisition bulletin, banknote, etc., so as to be able to then store and/or analyze it by the bias of specific processing software, whereby the results of the processing can then be supplied to a central information collecting site.

19. Process according to claim 3, characterized in that the processing device performs the operation by means of coefficients contained in the buffer store making it possible to obtain the desired linearization by several successive passes for a given pixel.

20. Process for the implementation of the scanner according to claim 19, characterized in that each sensor pixel is subject to a processing with several coefficients of the response curve thereof, whereby said processing can be nonlinear.

21. Process according to claim 19, characterized in that the table incorporates mixed coefficients of individual equalizing and/or uniformity curves.

22. Process according to any one of the claims 3 or 21, characterized in that the sensor linearization and correction coefficients are mixed with specific correction coefficients of the image in a single coefficient table.

23. Process according to any one of the claims 3 or 21, characterized in that the image is processed during acquisition in all desired ways at the same time as the sensor linearization and correction operations.

24. Process according to any one of the claims 3 or 21, characterized in that the relation existing between several pixels is translated in the form of matrix operations.

25. Process according to claim 24, characterized in that so as to process the pixels in real time by the order of arrival, the processing device of the acquired pixels uses coefficients and injects into the multiplier said different coefficients by means of multiplexers, the device being able to perform a plurality of operations on the pixels as the latter are acquired and consequently in real time.

26. Process according to any one of the claims 3 or 21, characterized in that for performing the specific corrections of the image, the device uses multidimensional matrixes.

27. Process according to any one of the claims 3 or 21, characterized in that, for determining the response curve coefficients, the device uses adaptive methods such as in particular least squares or gradients.

28. Process according to any one of the claims 3 or 21, characterized in that the device uses specific correction matrixes, namely the Laplace and/or Taylor matrix.

29. Process according to claim 26, characterized in that the relation of a matrix with n dimensions is transformed into n unidimensional matrix relations.

30. Process according to claim 29, characterized in that the processing device can process part of said relation and in that the central processing unit can apply a part or the remainder of the processing to the image during acquisition.

31. Process according to any one of the claims 3 or 21, characterized in that processing takes place individually or by groups of pixels, permitting the linearization of each pixel and the specific processing of a group of pixels, i.e. each pixel is processed taking account of its neighbouring pixels, the thus processed pixels being stored in a buffer store.

32. Process according to claim 31, characterized in that the pixels of a thus acquired and processed image are supplied to the buffer store of the device, where they are stored and then supplied to the central processing unit in successive batches for storing the image.

33. Process according to claim 30, characterized in that the central processing unit performs the processing during the dead time remaining between the image storages.

34. Process according to any one of the claims 3 or 21, characterized in that real time resolution changes of the definition takes place at a number of points of an image in all directions.

35. Process according to any one of the claims 3 or 21, characterized in that there are real time changes of the number of colour levels.

36. Process according to any one of the claims 3 or 21, characterized in that it is possible to perform any very complex, specific or non-specific, digital processing of the images during acquisition.

37. Digital processing method for control of a scanner having photosensitive sensors, an illuminating device, a driving mechanism, and a central processing unit for performing in real time digital processing of an image acquired, the image comprising a plurality of pixels, the method comprising the steps of:
  subjecting the pixels of a sensor, one by one, to a calculation of their response-curves, the curves obtained being non-linear, multi-coefficients and representing sensitivity as a function of received light level, linearizing each pixel and storing the values of each curve associated with each pixel in tables, subjecting the individual pixel curves to an operation of rendering uniform the complete sensor, so that the pixels of the sensor have precisely the same sensitivity curve, calculating the curve coefficients and storing the results in a random access buffer store, determining linearization coefficients necessary for obtaining the desired linearization, in a first phase for each pixel and then in a second phase for all the pixels of the sensor, once the linearization operation has been carried out both individually and globally for the complete sensor, storing each calculated linearization coefficient in the random access buffer store, and mixing the linearization coefficients and the image computing coefficients of the pixels with sensor uniformizing coefficients.

* * * * *

UNITED STATES PATENT AND TRADEMARK OFFICE
CERTIFICATE OF CORRECTION

PATENT NO. : 5,812,706
DATED : September 22, 1998
INVENTOR(S) : Bertrand et al.

It is certified that error appears in the above-identified patent and that said Letters Patent is hereby corrected as shown below:

On the title page, Section [75], delete "45116" and insert --75116--.

Column 11, Line 45, Claim 19, delete "claim 3" and insert --claim 18--.

Column 11, Line 56, Claim 21, delete "claim 19" and insert --claim 37--.

Column 11, Line 59, Claim 22, delete "claims 3 or 21" and insert --claims 21 or 37--.

Column 11, Line 64, Claim 23, delete "claims 3 or 21" and insert --claims 21 or 37--.

Column 12, Line 1, Claim 24, delete "claims 3 or 21" and insert --claims 21 or 37--.

Column 12, Line 11, Claim 26, delete "claims 3 or 21" and insert --claims 21 or 37--.

BEST AVAILABLE COPY

UNITED STATES PATENT AND TRADEMARK OFFICE
CERTIFICATE OF CORRECTION

PATENT NO. : 5,812,706
DATED : September 22, 1998
INVENTOR(S) : Bertrand et al.

It is certified that error appears in the above-identified patent and that said Letters Patent is hereby corrected as shown below:

Column 12, Line 14, Claim 27, delete "claims 3 or 21" and insert --claims 21 or 37--.

Column 12, Line 19, Claim 28, delete "claims 3 or 21" and insert --claims 21 or 37--.

Column 12, Line 29, Claim 31, delete "claims 3 or 21" and insert --claims 21 or 37--.

Column 12, Line 46, Claim 34, delete "claims 3 or 21" and insert --claims 21 or 37--.

Column 12, Line 50, Claim 35, delete "claims 3 or 21" and insert --claims 21 or 37--.

Column 12, Line 53, Claim 36, delete "claims 3 or 21" and insert --claims 21 or 37--.

Signed and Sealed this

Sixteenth Day of March, 1999

Attest:

Q. TODD DICKINSON

*Attesting Officer*          *Acting Commissioner of Patents and Trademarks*